US011314820B2

(12) United States Patent
Chander et al.

(10) Patent No.: US 11,314,820 B2
(45) Date of Patent: *Apr. 26, 2022

(54) SYSTEMS AND METHODS FOR WEB COLLABORATION

(71) Applicant: CITRIX SYSTEMS, INC., Fort Lauderdale, FL (US)

(72) Inventors: Ramesh Chander, Delray Beach, FL (US); Clavian Sequeira, Fort Lauderdale, FL (US); Jeroen Van Rotterdam, Fort Lauderdale, FL (US)

(73) Assignee: CITRIX SYSTEMS, INC., Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/892,565

(22) Filed: Jun. 4, 2020

(65) Prior Publication Data
US 2020/0293579 A1 Sep. 17, 2020

Related U.S. Application Data (63) Continuation of application No. 16/056,887, filed on Aug. 7, 2018, now Pat. No. 10,678,867.

(Continued)

(51) Int. Cl.
*G06F 16/93* (2019.01)
*G06Q 10/10* (2012.01)
(Continued)

(52) U.S. Cl.
CPC ............ *G06F 16/93* (2019.01); *G06F 16/176* (2019.01); *G06F 16/907* (2019.01); *G06F 16/953* (2019.01); *G06F 16/958* (2019.01); *G06F 16/9535* (2019.01); *G06F 40/169* (2020.01); *G06F 40/279* (2020.01); *G06Q 10/101* (2013.01); *H04L 67/42* (2013.01);
(Continued)

(58) Field of Classification Search
CPC ..................................................... G06F 40/279
See application file for complete search history.

(56) References Cited

U.S. PATENT DOCUMENTS 9,146,116 B1* 9/2015 Champaneria ....... G06Q 10/025
9,176,744 B2 11/2015 Lee
(Continued)

OTHER PUBLICATIONS

Westlaw Next "Sharing Folders on WestlawNext: Sharing Folders Inside and Outside Your Organization" https://info.legalsolutions.thomsonreuters.com/pdf/wln2/L-363757.pdf; retreived from internet Jan. 9, 2020; pp. 12.

*Primary Examiner* — Di Xiao
(74) *Attorney, Agent, or Firm* — Allen, Dyer, Doppelt + Gilchrist, PA (57) ABSTRACT

A server includes a memory and a processor coupled to the memory. The memory stores shared documents used for collaboration, with each shared document having respective keywords associated therewith. The processor receives a user-selected portion of a web page displayed on at least one client device, matches keywords from the shared documents to keywords associated with the user-selected portion of the displayed web page, and selects at least one of the shared documents based upon the matching. The selected portion of the displayed web page is appended to the selected at least one shared document.

20 Claims, 8 Drawing Sheets

Related U.S. Application Data (60) Provisional application No. 62/546,131, filed on Aug. 16, 2017.

(51) Int. Cl.
*G06F 16/953* (2019.01)
*G06F 16/907* (2019.01)
*G06F 40/169* (2020.01)
*G06F 40/279* (2020.01)
*G06F 16/958* (2019.01)
*G06F 16/176* (2019.01)
*G06F 16/9535* (2019.01)
*H04L 67/01* (2022.01)
*G06F 3/04817* (2022.01)
*G06F 3/0482* (2013.01)
*G06F 3/04842* (2022.01)

(52) U.S. Cl.
CPC ........ *G06F 3/0482* (2013.01); *G06F 3/04817* (2013.01); *G06F 3/04842* (2013.01)

(56) References Cited

U.S. PATENT DOCUMENTS

| | | | |
|---|---|---|---|
| 9,538,345 B2 | 1/2017 | Sah et al. | |
| 10,503,806 B2* | 12/2019 | Flake | H04L 67/02 |
| 2008/0016091 A1 | 1/2008 | Chandra | |
| 2008/0306913 A1 | 12/2008 | Newman et al. | |
| 2009/0199158 A1* | 8/2009 | Bolt | G06F 16/986 |
| | | | 717/107 |
| 2010/0070851 A1 | 3/2010 | Chen et al. | |
| 2014/0365868 A1* | 12/2014 | Cai | G06F 40/14 |
| | | | 715/234 |
| 2014/0372865 A1 | 12/2014 | Corob et al. | |
| 2015/0248429 A1* | 9/2015 | Pregueiro | G06F 16/168 |
| | | | 715/202 |
| 2016/0162173 A1 | 6/2016 | Chandra | |
| 2018/0183901 A1* | 6/2018 | Lariviere | H04L 69/08 |
| 2018/0285321 A1* | 10/2018 | Antony | G06K 9/6892 |

* cited by examiner

SYSTEMS AND METHODS FOR WEB COLLABORATION

RELATED APPLICATION

This application is a continuation of application Ser. No. 16/056,887 filed on Aug. 7, 2018 which claims the benefit of provisional application Ser. No. 62/546,131 filed Aug. 16, 2017, which is hereby incorporated herein in its entirety by reference.

TECHNICAL FIELD

The present disclosure relates to computing systems, and more particularly, to a computing system for web collaboration among team members and related methods.

BACKGROUND

While working on research or collaborative projects, team members compile documents by piecing snippets and images from the web. Other use cases for collecting information as viewed by team members include compliance and electronic discovery, for example.

Often team members may need to work on multiple documents. Most team members typically maintain a document and start copying information into it or they start a long email chain with the other team members.

Maintaining multiple documents across multiple computing devices and across team members can be difficult to manage. Also, in some team projects, a large amount of time may be spent by multiple team members researching the same topic. Over time a research document might get too bulky and it gets harder to highlight the most relevant snippets.

SUMMARY

A server includes a memory and a processor coupled to the memory. The memory is configured to store a plurality of shared documents used for collaboration, with each shared document having respective keywords associated therewith. The processor is configured to receive a user-selected portion of a web page displayed on at least one client device, match keywords from the shared documents to keywords associated with the user-selected portion of the displayed web page, and select at least one of the shared documents based upon the matching. The selected portion of the displayed web page is appended to the selected at least one shared document.

The processor may be further configured to scan the selected portion of the displayed web page for keyword occurrence, and selection of the at least one shared document may be based on a frequency of the keywords in the selected portion of the displayed web page exceeding a frequency threshold.

If the frequency of the keywords does not exceed the frequency threshold, then the processor may be further configured to scan all of the displayed web page for keyword occurrence, and selection of the at least one shared document may be based on the frequency of the keywords in all of the displayed web page exceeding the frequency threshold.

If the frequency of the keywords does not exceed the frequency threshold, then the processor may be further configured to display a list of the shared documents for a user of the at least one client device to select the at least one shared document that is to receive the selected portion of the displayed web page as an appendage.

The at least one client device interfaces with a browser, with web pages being accessed by the browser based on a search query. The processor may be further configured to match keywords from the shared documents to keywords associated with the portion of the displayed web page based on context of the words used in the search query.

The processor may be further configured to append metadata from the displayed web page to the selected at least one shared document.

The metadata may include at least one of a name of a user who collected the displayed portion of the web page, data/time at which the displayed portion of the web page was collected, and a link to the web page from which the displayed portion of the web page originated.

The selected portion of the displayed web page comprises snippet text, and the words associated with the displayed portion of the web page may correspond to words in the snippet text.

The selected portion of the displayed web page comprises an image with metadata associated therewith, and the words associated with the displayed portion of the web page may correspond to words in the metadata.

The selected portion of the displayed web page comprises an image, and wherein the processor may be further configured to create a thumbnail of the image, with the thumbnail being appended to the selected at least one shared document.

The at least one client device may comprise a plurality of client devices, with each client device displaying a respective web page having a portion thereof selected. The processor may be configured to append the selected portions of the respective web pages across the plurality of client devices.

If at least two of the selected portions of the respective web pages are to be appended at a same time, then the processor will queue the at least two selected portions of the respective web pages and append one after the other.

The processor may be further configured to create a new shared document for collaboration based on user input if the selected portion of the displayed web page is not appended to an existing shared document.

Another aspect is directed to a method for operating a server as described above. The method includes storing a plurality of shared documents used for collaboration, with each shared document having respective keywords associated therewith, and receiving a user-selected portion of a web page displayed on at least one client device. The method further includes matching keywords from the shared documents to keywords associated with the user-selected portion of the displayed web page, and selecting at least one of the shared documents based upon the matching. The selected portion of the displayed web page is appended to the selected at least one shared document.

Yet another aspect is directed to a non-transitory computer readable medium having a plurality of computer executable instructions for causing a server to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
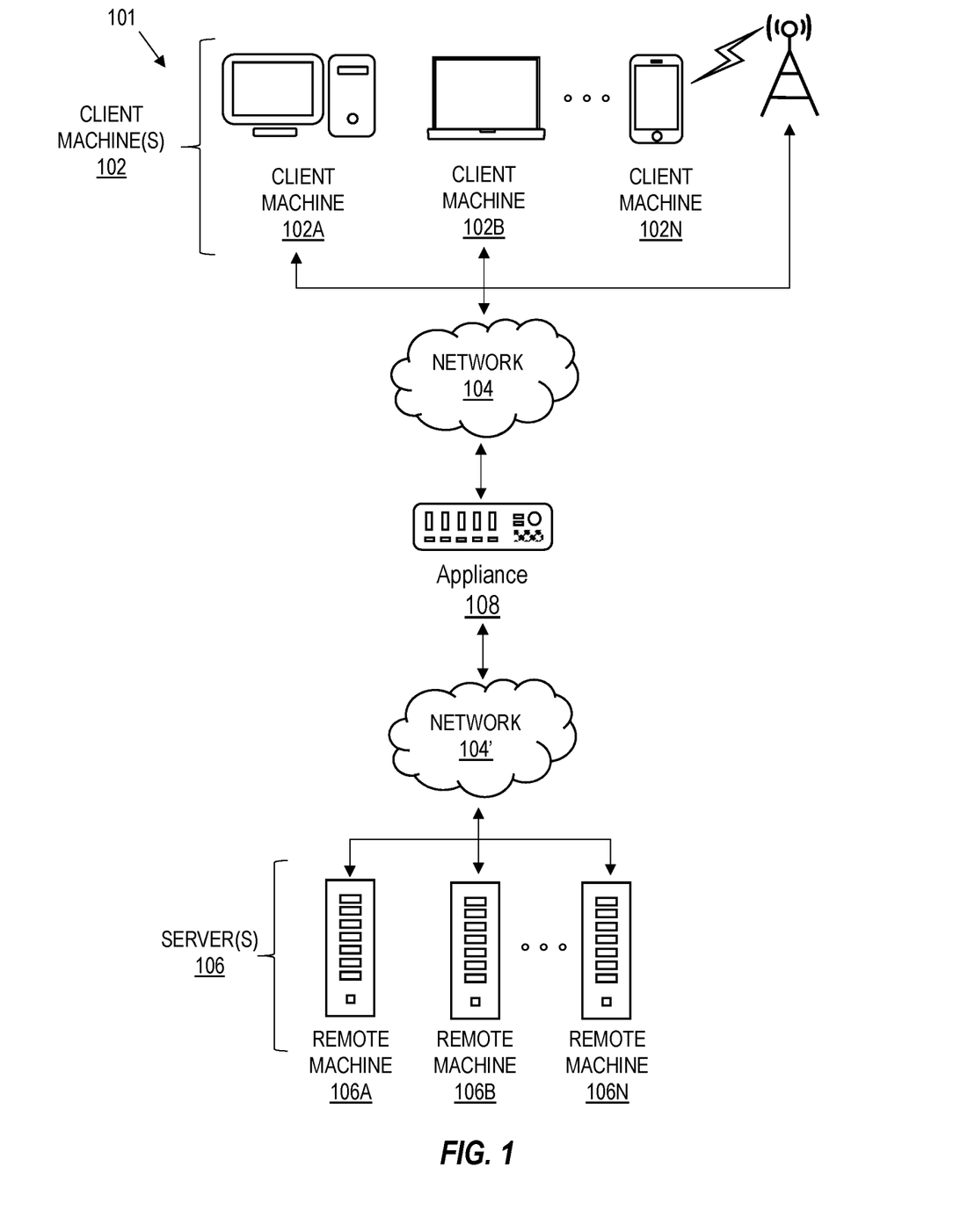
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
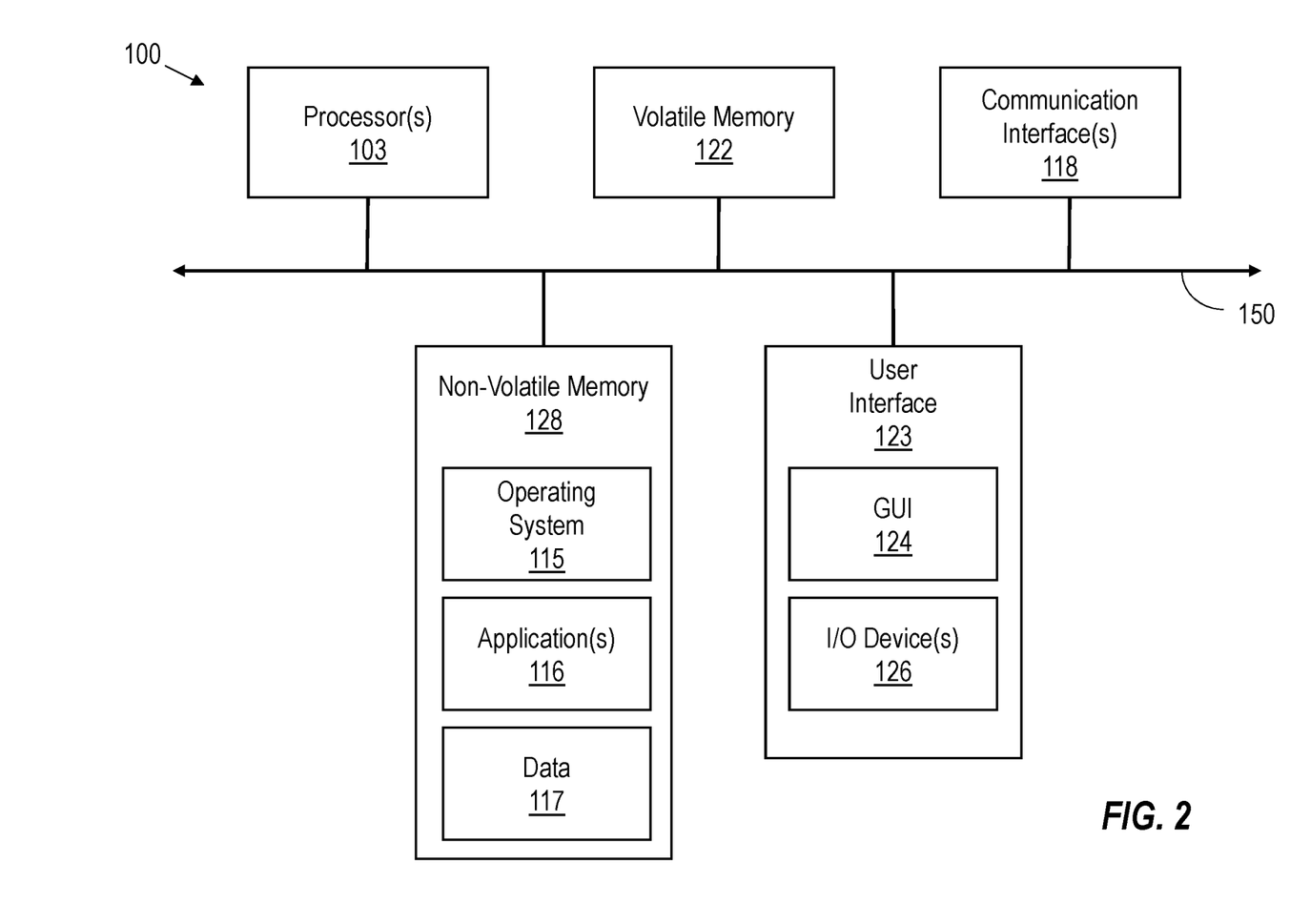
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
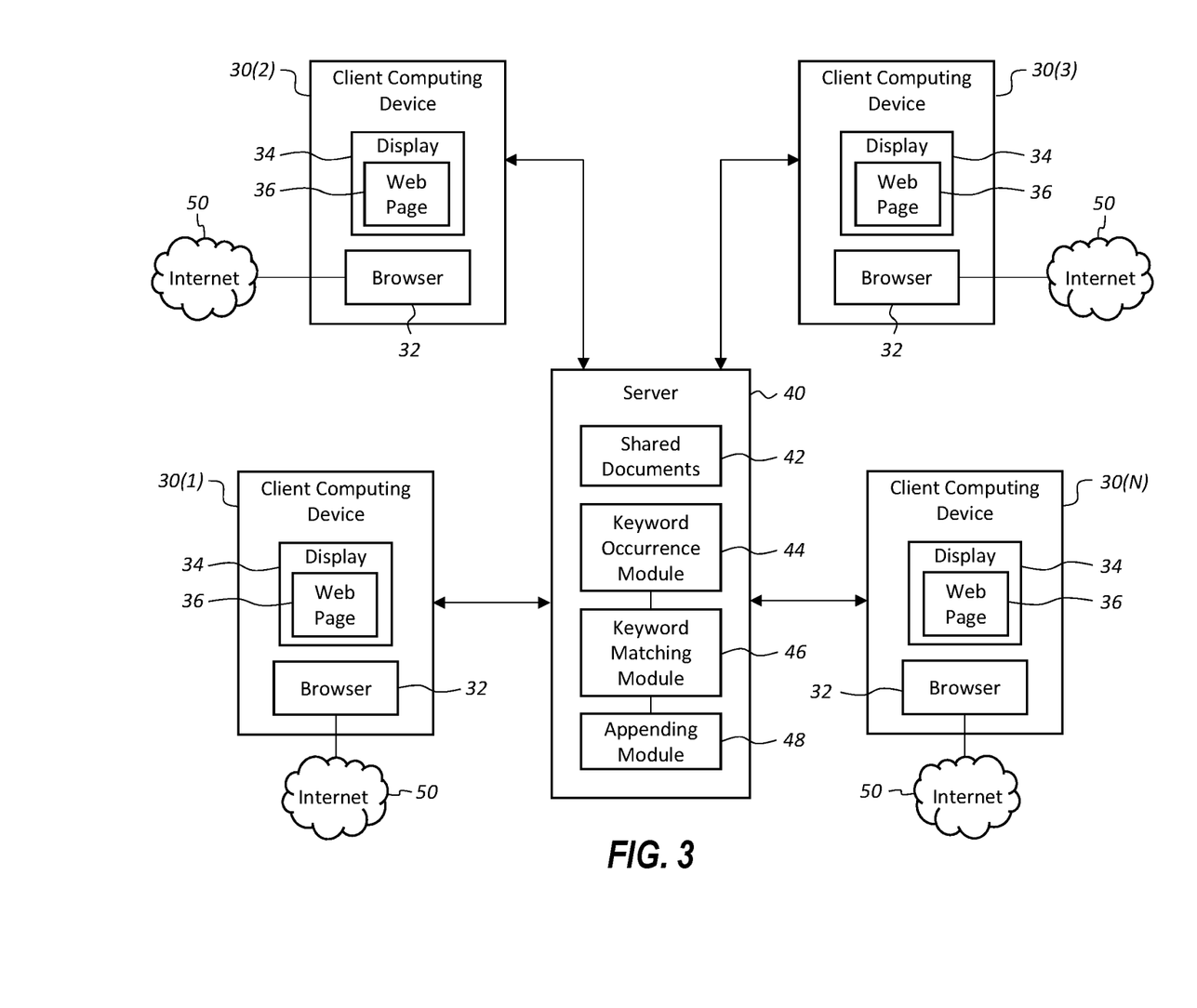
FIG. 3 is a block diagram of a computing system that includes client computing devices and a server supporting web collaboration in which various aspects of the disclosure may be implemented.

Referring initially to FIG. 3, a computing system 20 that supports web collaboration will be discussed. As will be explained in detail below, the shared documents 42 that are part of the web collaboration are stored at a server 40, with each shared document having keywords associated therewith. A selected portion of a web page 36 is appended to one of the shared documents 42 based on the server 40 matching keywords between the selected portion of the web page 36 and the shared documents 42. If a user browsing the web is collecting snippets and images for different topics, then the use of analytics by the server 40 to determine which shared document is to receive a snippet or image prevents the user from having to open and close multiple shared documents 42.

The illustrated computing system 20 includes client computing devices 30(1)-30(n) and at least one server 40. The client computing devices 30(1)-30(n) may be generally referred to as client computing device 30. Each client computing device 30 interfaces with a browser 32 for accessing a web page 36 via the Internet 50. A display 34 is associated with each client computing device 30 for displaying the web page 36. A portion of the displayed web page 36 is selected by a user of the client computing device 30. The selected portion 82 of the displayed web page 36 may be a snippet or an image.

The server 40 is configured to store the shared documents 42 used for collaboration, with each shared document 42 having respective keywords associated therewith. Responsive to selection of the portion of the displayed web page 36, the server 40 is further configured to execute an algorithm to match keywords from the shared documents 42 to keywords associated with the selected portion of the displayed web page 36, and select one of the shared documents 42 based upon the matching. The selected portion of the displayed web page 36 is appended to the selected shared document by the server 40.

Figure 4:
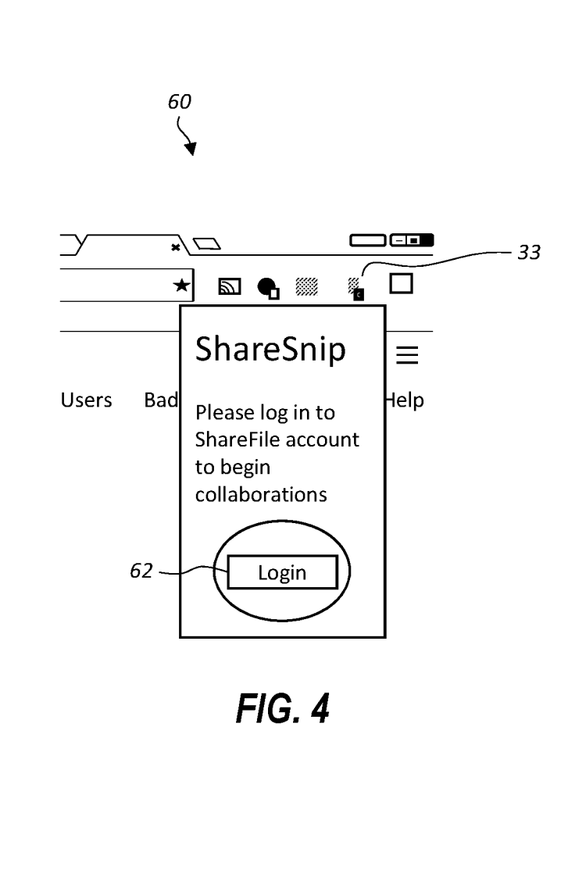
FIG. 4 is a screen shot of a web collaboration plug-in for the browsers illustrated in FIG. 3.

To support web collaboration on a client computing device 30, the browser 32 includes a browser extension as represented by an extension icon/button 33, as illustrated by the screen shot 60 in FIG. 4. The browser extension is a plug-in that extends the functionality of the browser 32 by supporting web collaboration. The illustrated plug-in may be referred to as ShareSnip. ShareSnip is an example name used for discussion purposes, and other names may be used to reference the plug-in. Alternatively, ShareSnip may be provided by javascript in a secure browser where web browsing activities are isolated.

The browser 32 may be one of various types, including a local browser, an embedded browser, or a hosted browser, for example. Generally speaking, a local browser is one that runs on a client computing device 30 and communicates directly with a target host (e.g., a web server) via the Internet. An embedded browser is a browser embedded within a native application. For example, Citrix Receiver and Citrix Workspace App are programs that are installed on client devices and provide an embedded browser. In some cases, the local and embedded browsers may be managed browsers which provide access to the Internet and/or enterprise resources in accordance with certain rules and permission levels. For example, Citrix XenMobile is software that provides mobile device management (MDM) and mobile application management (MAM), including micro-VPN technology allowing VPN access on a per-application basis. A hosted browser is run remotely on a cloud or network server, such as in a virtual computing session, and displayed locally at a client computing device 30. For example, such hosted browsers are provided through the Citrix Secure Browser Service.

To start web collaboration via ShareSnip, a user of the client computing device 30 is to login to a ShareFile account by selecting the login prompt 62 on screen shot 60. After the user is logged in, the user's collaborations on ShareFile are displayed. As illustrated in the screen shot 70 in FIG. 5, a list 72 of the shared files/documents 42 stored on the server 40 is provided. Each shared document 42 is directed to a particular topic, and has keywords 74 associated therewith, as well as a link to download the shared document. The names of the shared documents 42 include the respective links.

Figure 5:
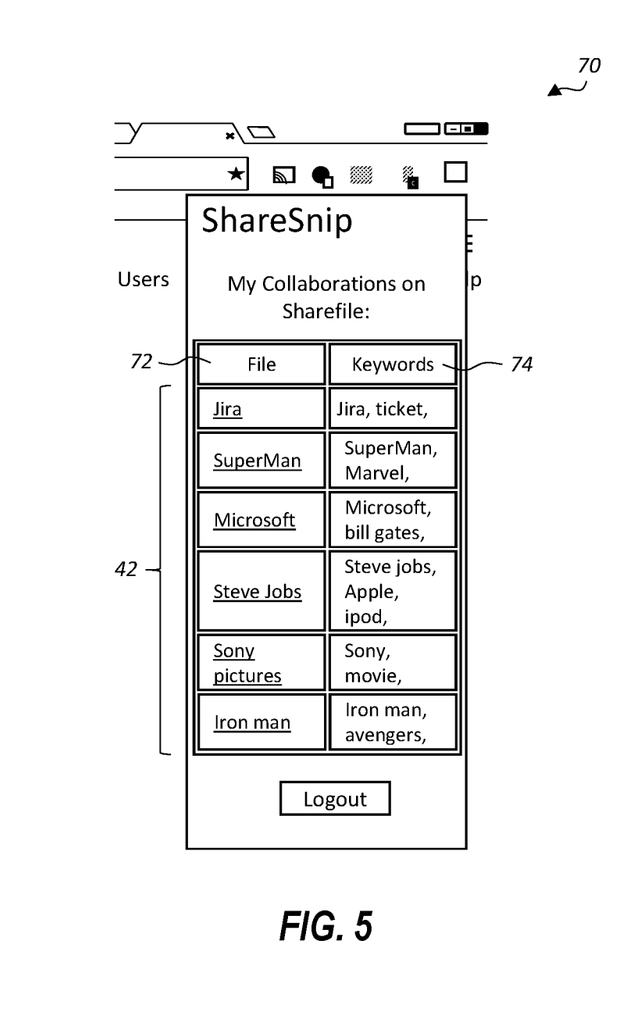
FIG. 5 is a screen shot of a list of the shared documents in the server illustrated in FIG. 3.

The list 72 of the shared documents 42 is accessible by other client computing devices 30 as permitted by ShareFile when collaborating with a team. In other situations, accessibility of the list 72 may be limited to just one user as part of their own research.

Figure 6:
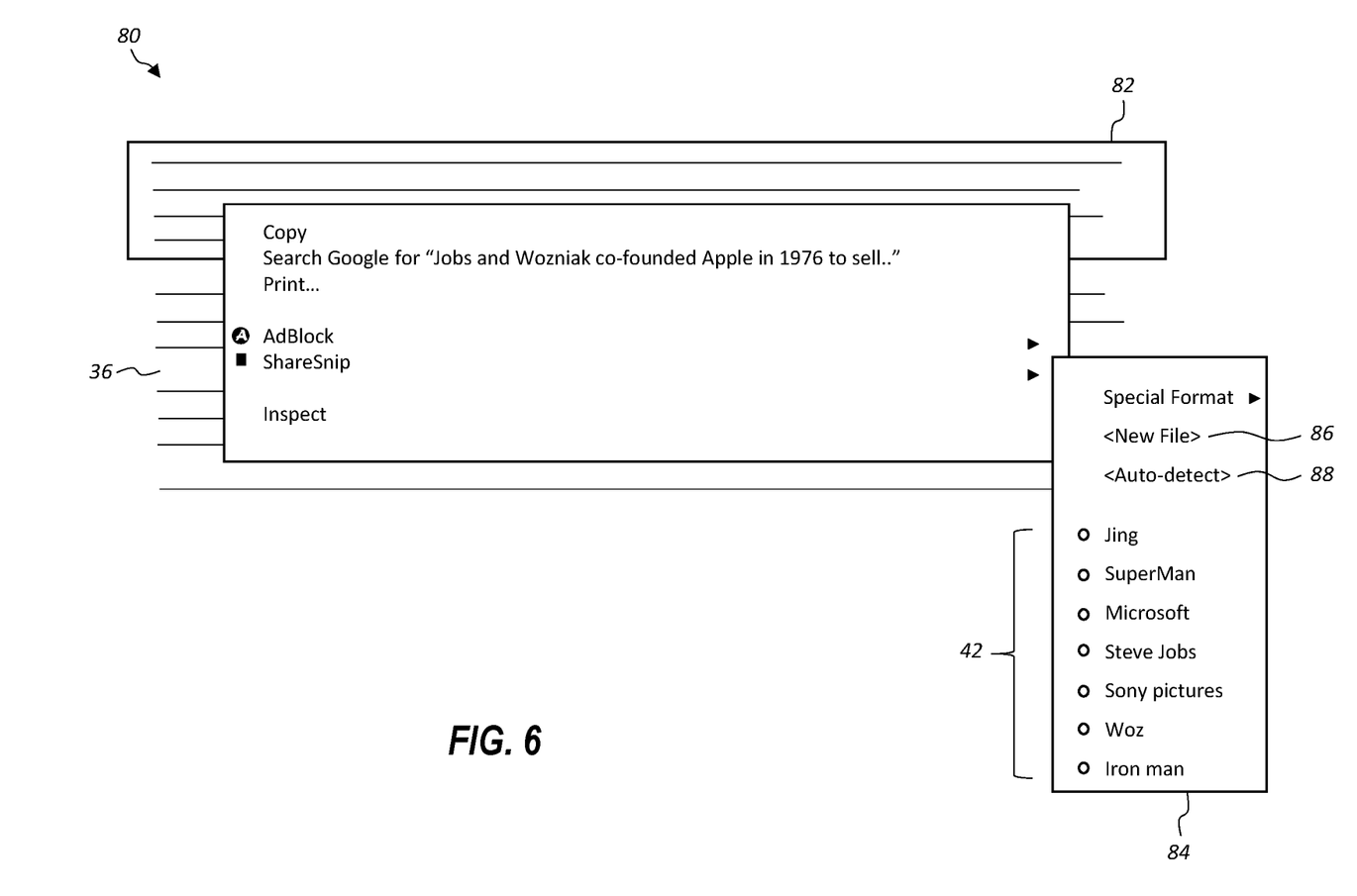
FIG. 6 is a screen shot of a selected portion of a displayed web page illustrated in FIG. 3 with menu options to save the selected portion.

A screen shot 80 of a displayed web page 36 is illustrated in FIG. 6, with a portion 82 of the displayed web page 36 having been selected by a user of the client computing device 30. After the portion 82 of the displayed web page 36 has been selected, the user may then select the ShareSnip plug-in via the extension icon/button 33. By selecting the ShareSnip extension icon/button 33, options via a menu 84 are presented to the user for saving the selected portion 82 of the displayed web page 36.

One of the options includes the user selecting the shared document 42 that is to receive the selected portion 82 of the displayed web page 36. Another option is for the user to save the selected portion 82 of the displayed web page 36 as a new document by selecting the new file prompt 86. Yet another option is for the user to select the auto-detect prompt 88. The auto detect prompt 88 causes the server 40 to determine which one of the shared documents 42 is to receive the selected portion 82 of the displayed web page 36 based on keyword matching.

One approach to keyword matching is based on term frequency. When the user selects the auto-detect prompt 88, the server 40 may include a keyword occurrence module 44 to scan the selected portion 82 of the displayed web page 36 for keyword occurrence. The keyword occurrence module 44 uses natural language processing and vector blend/term frequency to examine the selected portion 82 of the displayed web page 36. There are a number of different matching algorithms that may be used. The matching algorithms may include an approximate string matching algorithm or a string-searching algorithm, for example.

The server 40 may also include a keyword matching module 46 to match keywords from the selected portion 82 of the displayed web page 36 to the keywords 74 associated with the shared documents 42. The keyword matching module 46 selects one of the shared documents 42 after matching the keywords based on a frequency of the keywords in the selected portion 82 of the displayed web page 36 exceeding a frequency threshold. The frequency threshold is used to avoid conflicts.

The server 40 may also further include an appending module 48 to append the selected portion 82 of the displayed web page 36 to the selected shared document 42. In other embodiments, the appending module 48 may append the selected portion 82 of the displayed web page 36 to more than one of the shared documents 42 as determined by the keyword matching module 46.

Another approach to keyword matching is based on taking into account the user's context of the search terms used to access the retrieved web pages. This provides a more tailored approach when matching the keywords associated with the portion of the displayed web page 36 to the shared documents 42.

The server 40 executes a specific matching algorithm based on the context, such as the Boyer-Moore string matching algorithm. The specific matching algorithm analyzes the words that surround other words and impacts their meaning or the setting in which the search terms are used. An example of context is the words that surround the word "read" that helps to determine the tense of the word, i.e., a verb or a noun.

Yet another approach to keyword matching is based on vector mapping. In vector mapping, the selected portion 82 of the displayed web page 36 is mapped to a vector and this is compared to the shared documents 42 that have also been vector mapped. To further enhance the vector for the selected portion 82 of the displayed web page 36, the user's context may also be added to the vector. These parameters may include, for example, location of the user, the document the user is working in, and events in the user's calendar, for example.

Figure 7:
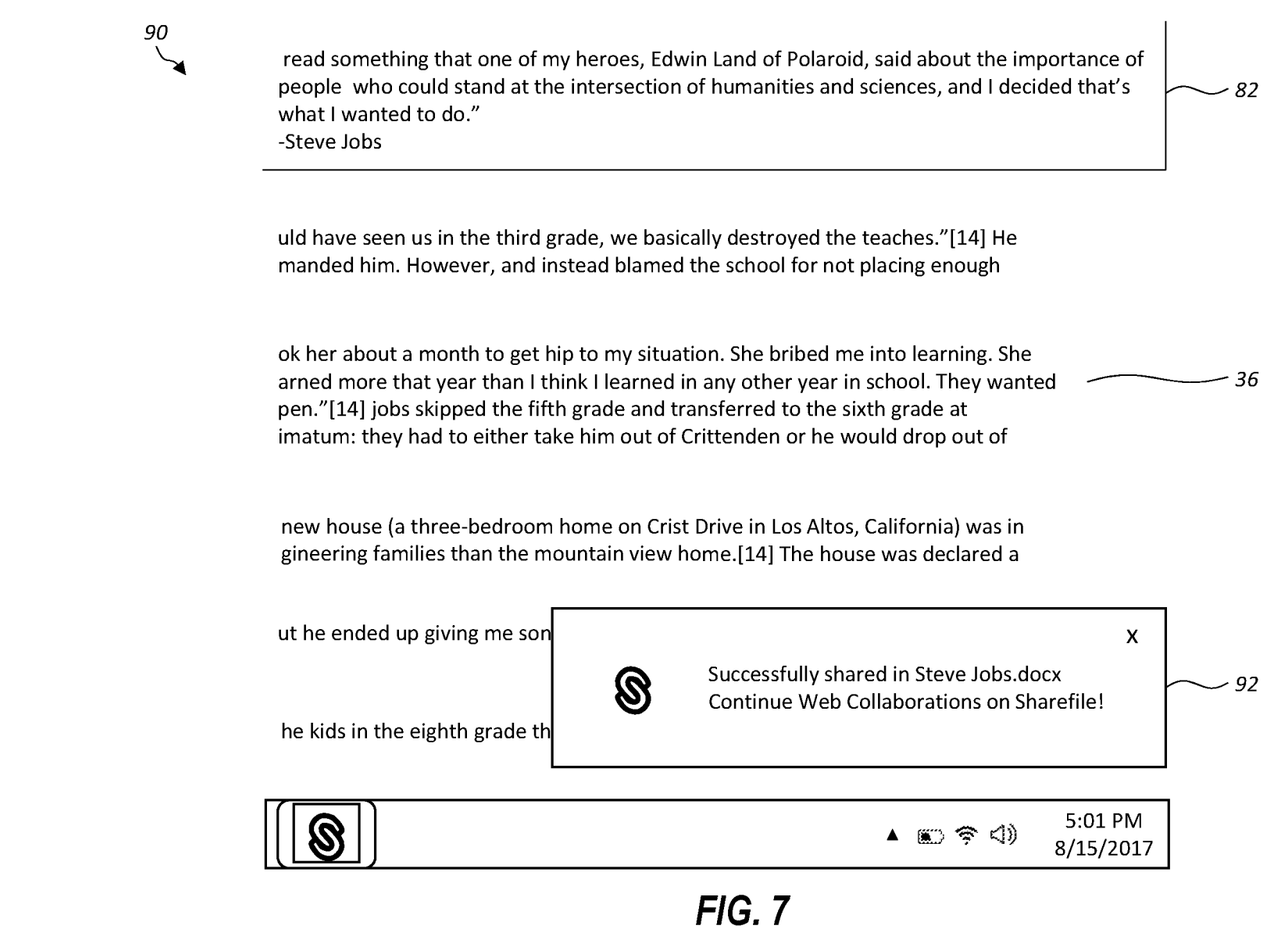
FIG. 7 is a screen shot of a displayed web page illustrated in FIG. 3 with a feedback caption indicating a successful appendage to a shared document.

If the selected portion 82 of the displayed web page 36 is successfully appended to one of the shared documents 42, then the user receives feedback as illustrated by the screen shot 90 in FIG. 7. The feedback is provided by a feedback caption 92 on the displayed web page 36. The feedback caption 92 also states the shared document 42 that received the selected portion 82 of the displayed web page 36. If the selected portion 82 of the displayed web page 36 is an image, the appending module 48 creates a thumbnail of the image, with the thumbnail being appended to the selected shared document 42.

If multiple client computing devices 30 are each displaying a respective web page 36 having a portion 82 thereof selected, then the appending module 48 is configured to append the selected portions 82 of the respective web pages 36 across the multiple client computing devices 30. If two or more of the selected portions 82 of the respective web pages 36 are to be appended at a same time, then the appending module 48 will queue the two or more selected portions 82 and append one after the other.

The server 40 in the illustrated example includes a keyword occurrence module 44, a keyword matching module 46, and an appending module 48. The function of these modules may be collectively performed by one or more processors within the server 40, or distributed across more than one server 40.

The server 40 advantageously uses keywords in the selected portion 82 of the displayed web page 36 to match keywords 74 from the shared documents to determine where the selected portion 82 of the displayed web page 36 is to be appended. Consequently, the user does not have to open and close a shared document 42 each time a selected portion 82 of a displayed web page 36 is to be stored. This is particularly helpful when the user is working on multiple research topics across multiple shared documents 42. In addition, since the shared documents 42 remain as unique documents on the server 40, this avoids maintaining multiple shared documents 42 across multiple client computing devices 30 for the same research topic.

The selected portion 82 of the displayed web page 36 may be a snippet or an image. The words in the snippet are the words associated with the displayed portion 82 of the web page 36. For the image, metadata associated with the image are the words associated with the displayed portion 82 of the web page 36.

Referring back to the keyword occurrence module 44, if the frequency of the keywords in the selected portion 82 of the displayed web page 36 does not exceed the frequency threshold, then the keyword occurrence module 44 scans all of the displayed web page 36 for keyword occurrence. Selection of the shared document 42 that is to receive the selected portion 82 of the displayed web page 36 is now based on the frequency of the keywords in all of the displayed web page 36 exceeding the frequency threshold.

If the frequency of the keywords in the selected portion 82 of the displayed web page 36 does not exceed the frequency threshold, then the keyword occurrence module 44 is configured to display a list of the shared documents. The user of the client computing device 30 then selects the shared document 42 that is to receive the selected portion 82 of the displayed web page 36 as an appendage.

Figure 8:
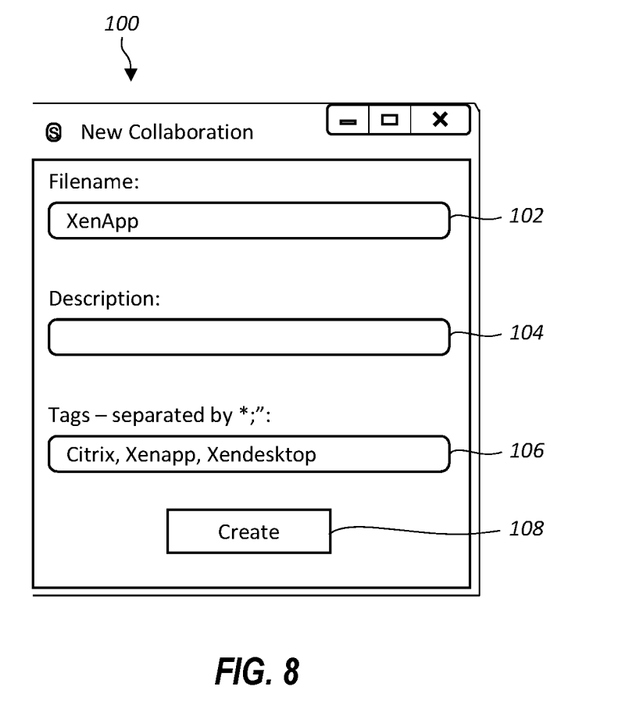
FIG. 8 is a screen shot of display prompts for saving a selected portion of the web page illustrated in FIG. 3 as a new shared document.

As an alternative to selecting one of the existing shared documents 42, the user can create a new shared document as illustrated in the screen shot 100 of FIG. 8. The screen shot 100 includes a filename prompt 102 for the user to enter a name for the new shared document. A description prompt 104 is for the user to enter a description of the new shared document. A tags or keywords prompt 106 is for the user to enter the keywords for the new shared document. After the information has been entered, the user creates the new shared document by selecting the create prompt 108.

Figure 9:
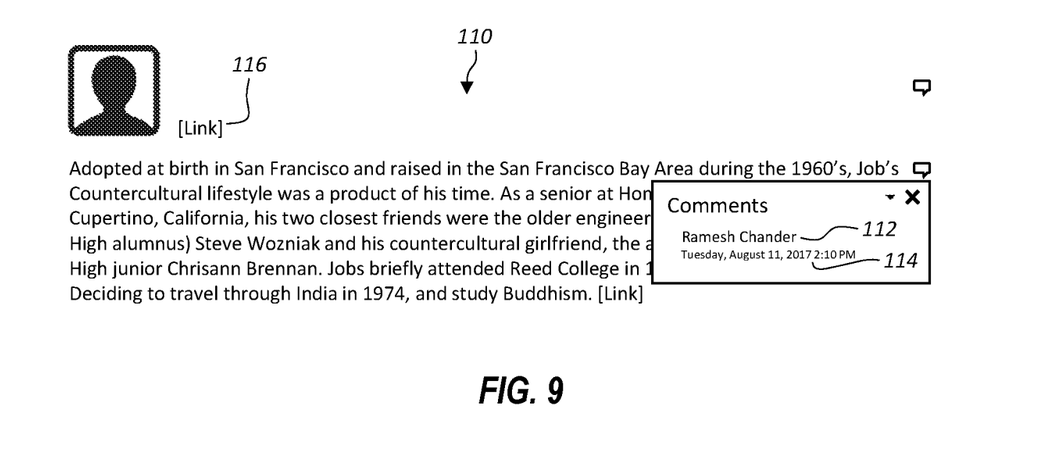
FIG. 9 is a screen shot showing metadata for the web page illustrated in FIG. 3.

The appending module 48 is further configured to append metadata from the displayed web page 36 to the selected shared document 42. The metadata for the web page 36 illustrated in FIG. 7 is provided by screen shot 110 in FIG. 9. The metadata includes a name of the user who collected the displayed portion of the web page as provided in display caption 112, and a data/time at which the displayed portion of the web page 36 was collected as provided in display caption 114. A link to the web page from which the displayed portion of the web page 36 originated is provided in display caption 116.

ShareSnip as described above advantageously simplifies web collaboration for individuals and teams performing research via the web. Other use cases for collecting information via ShareSnip as viewed by team members include compliance and electronic discovery, for example.

Since the research is backed by a unique document in ShareFile, it avoids maintaining multiple documents across multiple devices and multiple users for the same research topic. Multiple users of a team researching the same topic can collaborate by collecting snippets in a document, which is stored in ShareFile. The document is available for all the users of team.

Each research subject is stored as a unique document in ShareFile. So if a user is working across multiple projects all his snippets are uniquely and correctly stored. This allows the user to easily gather data about multiple topics without having to open/close multiple documents. Metadata information about the website from which snippet is collected is also appended to the document. Since the metadata is stored in the document each contributing user is aware of the websites already researched. Thus, it helps to reduce time spent in duplicate research.

If the user is researching multiple topics at the same time, the auto-detect feature is helpful to easily insert the snippet/image into the relevant document based on keywords from the website/snippet. ShareSnip creates thumbnails for images which reduces the storage space for images. ShareSnip also provides a way to highlight/bold some snippets so that it stands out in the document. In a Secure Browser an image snapshot of the web page can be performed and sent to ShareFile to store in a document.

Figure 10:
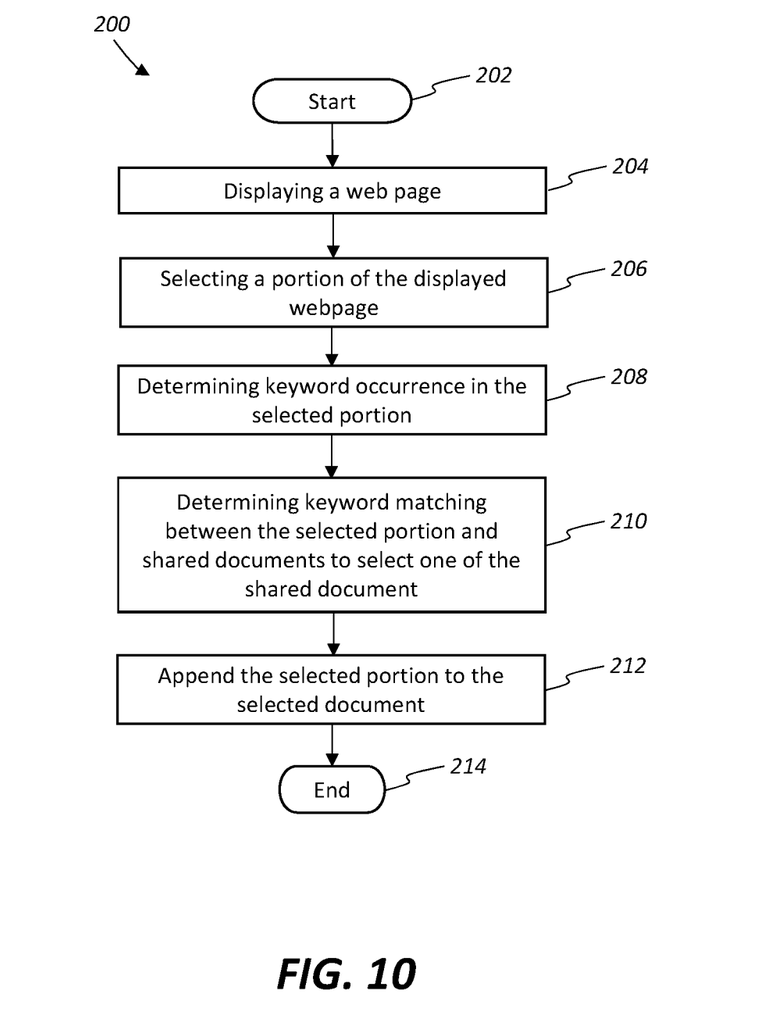
FIG. 10 is a flowchart illustrating a method for operating the computing system illustrated in FIG. 3.

Referring now to the flowchart 200 in FIG. 10, a method for operating the computing system 20 includes from the start (Block 202) displaying a web page 36 at Block 204. A user operates a client computing device 30 that interfaces with a browser 32 for accessing a web page 36, and that includes a display 34 associated therewith for displaying the web page 36. A portion 82 of the displayed web page 36 is selected by the user at Block 206.

A server 40 is also operated to store a plurality of shared documents 42 used for collaboration, with each shared document having respective keywords associated therewith. The server 40 determines keyword occurrence in the selected portion 82 of the web page 36 at Block 208. Keyword matching is performed at Block 210 between the selected portion 82 of the web page 36 and the shared documents 42 to select one of the shared documents that is to receive the selected portion 82 of the web page 36. The selected portion 82 of the web page 36 is appended to the selected document at Block 212. The method ends at Block 214.

Another aspect is directed to a non-transitory computer readable medium for operating a server 40 that is part of a computing system 20 comprising at least one client computing device 30 that interfaces with a browser 32 for accessing a web page 36, and that includes a display 34 associated therewith for displaying the web page 36, and with a portion 82 of the displayed web page 36 being selected.

The non-transitory computer readable medium has a plurality of computer executable instructions for causing the server 40 to store a plurality of shared documents 42 used for collaboration, with each shared document 42 having respective keywords associated therewith. Responsive to selection of the portion 82 of the displayed web page 36, keywords from the shared documents 42 are matched to keywords associated with the portion 82 of the displayed web page 36. One of the shared documents 42 is selected based upon the matching. The selected portion 82 of the displayed web page 36 is appended to the selected shared document.

Many modifications and other embodiments will come to the mind of one skilled in the art having the benefit of the teachings presented in the foregoing descriptions and the associated drawings. Therefore, it is understood that the disclosure is not to be limited to the specific embodiments That which is claimed:

1. A server comprising:
a memory configured to store a plurality of shared documents used for collaboration, with each shared document having respective keywords associated therewith; and
a processor coupled to said memory and configured to perform the following:
receive a user-selected portion of a web page displayed on at least one client device after the plurality of shared documents have been stored in said memory,
match keywords from the shared documents to keywords associated with the user-selected portion of the displayed web page,
select at least one of the shared documents based upon the matching, and
append the selected portion of the displayed web page to the selected at least one shared document.

2. The server according to claim 1 wherein said processor is further configured to scan the selected portion of the displayed web page for keyword occurrence, and selection of the at least one shared document is based on a frequency of the keywords in the selected portion of the displayed web page exceeding a frequency threshold.

3. The server according to claim 2 wherein if the frequency of the keywords does not exceed the frequency threshold, then said processor is further configured to scan all of the displayed web page for keyword occurrence, and selection of the at least one shared document is based on the frequency of the keywords in all of the displayed web page exceeding the frequency threshold.

4. The server according to claim 2 wherein if the frequency of the keywords does not exceed the frequency threshold, then said processor is further configured to display a list of the shared documents for a user of the at least one client device to select the at least one shared document that is to receive the selected portion of the displayed web page as an appendage.

5. The server according to claim 1 wherein the at least one client device interfaces with a browser, with web pages being accessed by the browser based on a search query, and wherein said processor is further configured to match keywords from the shared documents to keywords associated with the portion of the displayed web page based on context of the words used in the search query.

6. The server according to claim 1 wherein said processor is further configured to append metadata from the displayed web page to the selected at least one shared document.

7. The server according to claim 6 wherein the metadata includes at least one of a name of a user who collected the displayed portion of the web page, data/time at which the displayed portion of the web page was collected, and a link to the web page from which the displayed portion of the web page originated.

8. The server according to claim 1 wherein the selected portion of the displayed web page comprises snippet text, and the words associated with the displayed portion of the web page correspond to words in the snippet text.

9. The server according to claim 1 wherein the selected portion of the displayed web page comprises an image with metadata associated therewith, and the words associated with the displayed portion of the web page correspond to words in the metadata.

10. The server according to claim 1 wherein the selected portion of the displayed web page comprises an image, and wherein said processor is further configured to create a thumbnail of the image, with the thumbnail being appended to the selected at least one shared document.

11. The server according to claim 1 wherein the at least one client device comprises a plurality of client devices, with each client device displaying a respective web page having a portion thereof selected, and wherein said processor is configured to append the selected portions of the respective web pages across the plurality of client devices.

12. The server according to claim 11 wherein if at least two of the selected portions of the respective web pages are to be appended at a same time, then said processor will queue the at least two selected portions of the respective web pages and append one after the other.

13. The server according to claim 1 wherein said processor is further configured to create a new shared document for collaboration based on user input if the selected portion of the displayed web page is not appended to an existing shared document.

14. A method comprising:
storing a plurality of shared documents used for collaboration, with each shared document having respective keywords associated therewith;
receiving a user-selected portion of a web page displayed on at least one client device after the plurality of shared documents have been stored;
matching keywords from the shared documents to keywords associated with the user-selected portion of the displayed web page;
selecting at least one of the shared documents based upon the matching; and
appending the selected portion of the displayed web page to the selected at least one shared document.

15. The method according to claim 14 further comprising scanning the selected portion of the displayed web page for keyword occurrence, and selection of the at least one shared document is based on a frequency of the keywords in the selected portion of the displayed web page exceeding a frequency threshold.

16. The method according to claim 15 wherein if the frequency of the keywords does not exceed the frequency threshold, then further comprising scanning all of the displayed web page for keyword occurrence, and selection of the at least one shared document is based on the frequency of the keywords in all of the displayed web page exceeding the frequency threshold.

17. The method according to claim 15 wherein if the frequency of the keywords does not exceed the frequency threshold, then further comprising displaying a list of the shared documents for a user of the at least one client device to select the at least one shared document that is to receive the selected portion of the displayed web page as an appendage.

18. The method according to claim 14 wherein the at least one client device interfaces with a browser, with web pages being accessed by the browser based on a search query, and further comprising matching keywords from the shared documents to keywords associated with the portion of the displayed web page based on context of the words used in the search query.

19. The method according to claim 14 further comprising appending metadata from the displayed web page to the selected at least one shared document.

20. A non-transitory computer readable medium having a plurality of computer executable instructions for causing a server to perform steps comprising:

storing a plurality of shared documents used fox collaboration, with each shared document having respective keywords associated therewith;

receiving a user-selected portion of a web page displayed on at least one client device after the plurality of shared documents have been stored;

matching keywords from the shared documents to keywords associated with the user-selected portion of the displayed web page;

selecting at least one of the shared documents based upon the matching; and     appending the selected portion of the displayed web page to the selected at least one shared document.

\* \* \* \* \*